US006985091B2

(12) United States Patent
Price

(10) Patent No.: US 6,985,091 B2
(45) Date of Patent: Jan. 10, 2006

(54) ELECTRONIC FLIGHT INSTRUMENT DISPLAYS

(75) Inventor: Ricardo A. Price, Kingwood, TX (US)

(73) Assignee: Chelton Flight Systems, Inc., Boise, ID (US)

(*) Notice: Subject to any disclaimer, the term of this patent is extended or adjusted under 35 U.S.C. 154(b) by 0 days.

(21) Appl. No.: 10/420,602

(22) Filed: Apr. 22, 2003

(65) Prior Publication Data

US 2003/0193411 A1    Oct. 16, 2003

Related U.S. Application Data

(62) Division of application No. 09/540,256, filed on Mar. 31, 2000.

(60) Provisional application No. 60/127,341, filed on Apr. 1, 1999, now abandoned.

(51) Int. Cl.
*G01C 23/00* (2006.01)

(52) U.S. Cl. .............. 340/975; 340/966; 340/967; 701/6

(58) Field of Classification Search .............. 340/975, 340/967, 966, 974, 973, 971, 963, 980; 701/6, 701/4, 9, 14, 3; 33/329
See application file for complete search history.

(56) References Cited

U.S. PATENT DOCUMENTS

| | | | |
|---|---|---|---|
| 3,686,936 A * | 8/1972 | Daudt, Jr. .............. 73/178 R |
| 4,247,843 A | 1/1981 | Miller et al. .............. 244/181 |
| 4,305,057 A * | 12/1981 | Rolston .............. 340/974 |
| 4,419,079 A | 12/1983 | Georges et al. .............. 434/241 |
| 4,454,496 A | 6/1984 | Lowe .............. 340/973 |
| 4,534,000 A | 8/1985 | Bliss .............. 244/186 |
| 4,554,545 A | 11/1985 | Lowe .............. 340/980 |
| 4,559,822 A * | 12/1985 | Huntington .............. 73/178 R |
| 4,860,007 A | 8/1989 | Konicke et al. .............. 73/179 |
| 5,003,305 A | 3/1991 | Kelly et al. .............. 340/974 |
| 5,136,301 A | 8/1992 | Bechtold et al. .............. 340/977 |
| 5,150,117 A | 9/1992 | Hamilton et al. .............. 340/973 |
| 5,198,812 A * | 3/1993 | Probert .............. 340/975 |
| 5,296,854 A | 3/1994 | Hamilton et al. .............. 340/980 |
| 5,343,395 A | 8/1994 | Watts .............. 340/951 |
| 5,357,263 A | 10/1994 | Fischer et al. .............. 340/975 |
| 5,359,890 A | 11/1994 | Fulton et al. .............. 340/973 |
| 5,412,382 A | 5/1995 | Leard et al. .............. 340/974 |
| 5,420,582 A | 5/1995 | Kubbat et al. .............. 340/974 |
| 5,459,666 A | 10/1995 | Casper et al. .............. 340/973 |
| 5,595,357 A * | 1/1997 | Catlin et al. .............. 340/966 |
| 5,654,890 A | 8/1997 | Nicosia et al. .............. 342/26 |
| 5,666,111 A | 9/1997 | Servat et al. .............. 340/980 |
| 5,668,542 A | 9/1997 | Wright .............. 340/971 |
| 5,844,504 A | 12/1998 | Etherington .............. 340/973 |

(Continued)

OTHER PUBLICATIONS

Moller, et al. "Synthetic Vision for Enhancing Poor Visibility Flight Operations" IEEE AES Systems, Magazine, Mar. 1994: pp. 27-33.

Poitier, et al. "Image Processing, A New Diagnostic Tool," IEEEAES Systems Magazine, Mar. 1994, pp. 34-37.

*Primary Examiner*—Brent A. Swarthout
(74) *Attorney, Agent, or Firm*—Fulbright & Jaworski, L.L.P.

(57) ABSTRACT

The present invention is directed to novel primary flight displays, moving map displays and engine parameter displays for aircraft cockpits. These displays process data gathered from various aircraft sensors and, using an various electronic databases, generate intuitive symbols that aid the pilot. The present invention also uses various novel algorithms that use data gathered from inexpensive sensors to derive parameters normally requiring far more expensive sensors.

1 Claim, 7 Drawing Sheets

U.S. PATENT DOCUMENTS

| | | | |
|---|---|---|---|
| 5,978,715 A | 11/1999 | Briffe et al. | 701/11 |
| 6,131,055 A * | 10/2000 | Patrick | 701/6 |
| 6,150,960 A * | 11/2000 | Voulgaris | 340/975 |
| 6,271,769 B1 * | 8/2001 | Frantz | 340/963 |
| 6,486,799 B1 * | 11/2002 | Still et al. | 340/974 |
| 6,567,014 B1 * | 5/2003 | Hansen et al. | 340/980 |

* cited by examiner $$CRAB = TRACK - HEADING$$

$$WIND_x = GROUNDSPEED \times COS(CRAB) - TAS \times COS(PITCH)$$

$$WIND_y = GROUNDSPEED \times SIN(CRAB)$$

$$WINDSPEED = \sqrt{WIND_x^2 + WIND_y^2}$$

$$WINDDIR = heading + ATN(WIND_y / WIND_x)$$

ELECTRONIC FLIGHT INSTRUMENT DISPLAYS

This application is a divisional of U.S. patent application Ser. No. 09/540,256 filed Mar. 31, 2000 was abandoned, which in turn claims the benefit of Prov. App. No. 60/127,341 filed Apr. 1, 1999.

BACKGROUND OF THE INVENTION

1. Field of the Invention

The present invention generally relates to the field of electronic flight instrument displays and, in particular, to primary flight displays, moving map displays, and engine parameter displays presented on electronic screens in aircraft cockpits.

2. Description of the Prior Art

It is well known in the art to provide displays presented on electronic screens in aircraft cockpits. Most modern commercial and military aircraft have several electronic screens capable of presenting: primary flight displays, moving maps or horizontal situation displays, engine parameter displays, and other displays. The present invention is directed to improvements and novel concepts related to primary flight displays, moving maps, and engine displays presented on electronic screens.

The primary flight display of the prior art consists of an electronic presentation of conventional flight data on a single screen. In other words, the symbology and information that would have been presented on separate airspeed indicators, altimeters, vertical speed indicators, artificial horizon/flight directors, and, in some cases, directional indicator/horizontal situation indicators, in pre-glass cockpit aircraft are presented together on a single display known as a primary flight display. Examples of prior art primary flight displays can be seen in U.S. Pat. Nos. 4,860,007, 5,136,301, 5,359,890, 5,412,382, and 5,844,504. All of the prior art primary flight displays essentially involve recreating conventional two-dimensional flight symbology on electronic screens. They offer the advantage of compacting the pilot's instrument scan into a smaller area resulting in less fatigue. They also offer advanced warning capabilities and enhanced reliability over mechanical flight instruments. Nevertheless, despite the fact that electronic screens do not have the same physical limitations as mechanical instruments, current primary flight displays retain archaic two-dimensional symbology which does not impart information to the pilot in a natural manner. Thus, use of current primary flights displays still requires extensive training and practice and is subject to the same misinterpretation errors as mechanical instruments.

Flight path markers, also known as flight path vectors or velocity vectors, are commonplace on Heads Up Displays (HUD). As used on a HUD, flight path markers show the pilot the aircraft's projected flight path upon the outside world. Thus, flight path markers are extremely useful for directing an aircraft towards real world objects such as runways and targets. Examples of flight path markers used on HUDs can be seen at U.S. Pat. Nos. 4,454,496, 4,554,545, 5,357,263, 5,654,890, and 5,666,111. U.S. Pat. No. 5,296,854 shows a flight path marker used with a helmet mounted display rather than a HUD. Flight path markers have also been used on attitude display indicators and primary flight displays. An example of such a use can be found at U.S. Pat. No. 5,003,305. However, showing a flight path marker on such traditional two-dimensional displays greatly reduces the utility of the flight path marker, which is preferably used in conjunction with a three-dimensional background.

Current glass cockpit moving maps and horizontal situation indicators generally improve upon information presentation to the pilot significantly over older mechanical horizontal situation indicators and directional indicators. The current state of the art is embodied in moving maps such as Jeppessen Corporation's Flitemap, Archangel System's CDS, Avidyne Corporation's Navigator, and EFIS offerings from Rockwell, Honeywell and others. It is known, for example, to generate a moving map using navigational symbols whose parameters are stored in electronic memory. It is also known to integrate other types of data onto such moving maps to relay information to the pilot from a vertical perspective. Thus, in some embodiments prior art moving maps offer the capability of integrating lightning strike information, traffic information, radar information, data-link weather and traffic information, geographic information, and bit-mapped graphical chart information with the aforementioned navigational symbol database. However, current moving map systems only display information and do not further process information based upon altitude to show the pilot immediate threats to flight safety.

Finally, current engine parameter displays tend to replicate mechanical gauges complete with yellow and red arcs representing areas of adverse engine operation. Some engine parameter displays present their data in a bar format with markers showing areas of adverse engine operation. Some engine parameter displays also include digital readouts of the particular engine parameter. However, prior art engine parameter displays still require the pilot to compare the position of the analog pointers or pie wedges to the previously mentioned warning arcs or markers to ascertain out of limit conditions. In addition, prior art engine parameter displays, which display real time engine parameters, suffer from the same drawbacks as mechanical gauges when it comes to detection of trends.

Accordingly, there exists a need for novel electronic flight instrument displays that take full advantage of the power inherent in modern microprocessors to interact with the pilot in a natural manner and relieve the pilot from the demands of continuously monitoring, comparing, and making mental calculations. Thus, primary flight displays should incorporate a flight path marker and present the marker with three-dimensional backgrounds and symbology for optimal use. Moving maps should take account of aircraft altitude to select whether to display certain symbols and to determine the color (i.e. threat level) of those symbols that are displayed. Moving maps should also take account of an aircraft's attitude and flight dynamics to present the aircraft's projected path. Finally, engine displays should make it vividly apparent when a parameter is out of limits through use of color and should display certain critical engine parameters in a time-lapse manner to aid trend spotting. These needs are met by the present invention.

SUMMARY OF THE INVENTION

The present invention is directed to novel primary flight displays, moving map displays and engine parameter displays for aircraft cockpits. These displays process data gathered from various aircraft sensors and, using a variety of electronic databases, generate intuitive symbols that aid the pilot. The present invention also uses various novel algorithms that allows use of data gathered from inexpensive sensors to derive parameters that normally require far more expensive sensors.

The primary flight display of the present invention discards the old-style two dimensional attitude indicator/flight director symbology in favor of creating a virtual three-dimensional world. The display makes use of a terrain database and, optionally, an obstruction database. Terrain and obstructions are presented three-dimensionally as the background of the primary flight display. Navigational symbology is likewise three-dimensional. By presenting a flight path marker to the pilot in conjunction with a three-dimensional display, the advantages of a HUD are realized on a panel-mounted electronic screen at far less cost, weight and power consumption. Unlike a HUED, the primary flight display of the present invention has the further advantage of being able to show a three-dimensional world for navigation in all weather conditions. In one embodiment, the primary flight display further includes a small, selected-waypoint focused moving map with course line for all-aspect situational awareness. In one particularly low-cost embodiment for light aircraft, aircraft pitch and roll become fixed and the primary flight display becomes a forward looking situational awareness display that intuitively presents the location of terrain, obstructions, and navigational points in three dimensional space in front of the aircraft.

The moving map of the present invention is similar to prior art moving maps with the exception that it imports aircraft altitude information and displays relevant obstruction and airspace information to the pilot. For example, by taking aircraft altitude into account, the moving map of the present invention can selectively display only terrain that is above and slightly below current aircraft altitude. In this way, non-critical information is not constantly displayed to distract the pilot, a distinct advantage over moving maps that use bit-mapped cartography. Likewise, obstructions to navigation can be selectively displayed depending upon whether they are a hazard to navigation at a particular aircraft altitude. Airspace limits can be drawn in different colors depending upon whether the aircraft will enter that airspace at its current altitude. By automatically displaying, not displaying, and symbolically coloring navigational symbols, the pilot's situational awareness is enhanced.

The engine parameter display of the present invention also includes enhancements that aid pilot situational awareness. Engine parameters are displayed as pie wedges with a leading needle and an integral digital display. However, the color of the entire pie wedge is keyed to the relationship of the selected engine parameter to its limit conditions. Normally the pie wedges are green to indicate a normal condition. As the engine parameter reaches its limit, the pie wedge's color changes from green to yellow and then to red to indicate progressively worsening conditions. An alternative, bar-type display is particularly useful for comparatively displaying multiple readings from the, same type of sensor, such as multiple cylinder head temperature or exhaust gas temperature readings from a multi-cylinder piston engine. As with the pie wedge display, the color of the bar indicates that parameter's condition. Furthermore, the highest reading is given a three-dimensional "unpushed" button look to make it stand out from the other bars. Likewise the lowest reading is given a three-dimensional "pushed" button look. Finally, certain parameters that are advantageously trended can be displayed in a recording chart time-lapse style so that deviations become immediately apparent.

Other objects, advantages and novel features of the present invention will become apparent from the following detailed description of the invention, when considered in conjunction with the accompanying drawings.

DESCRIPTION OF THE PREFERRED EMBODIMENTS

1. The Primary Flight Display

Figure 1:
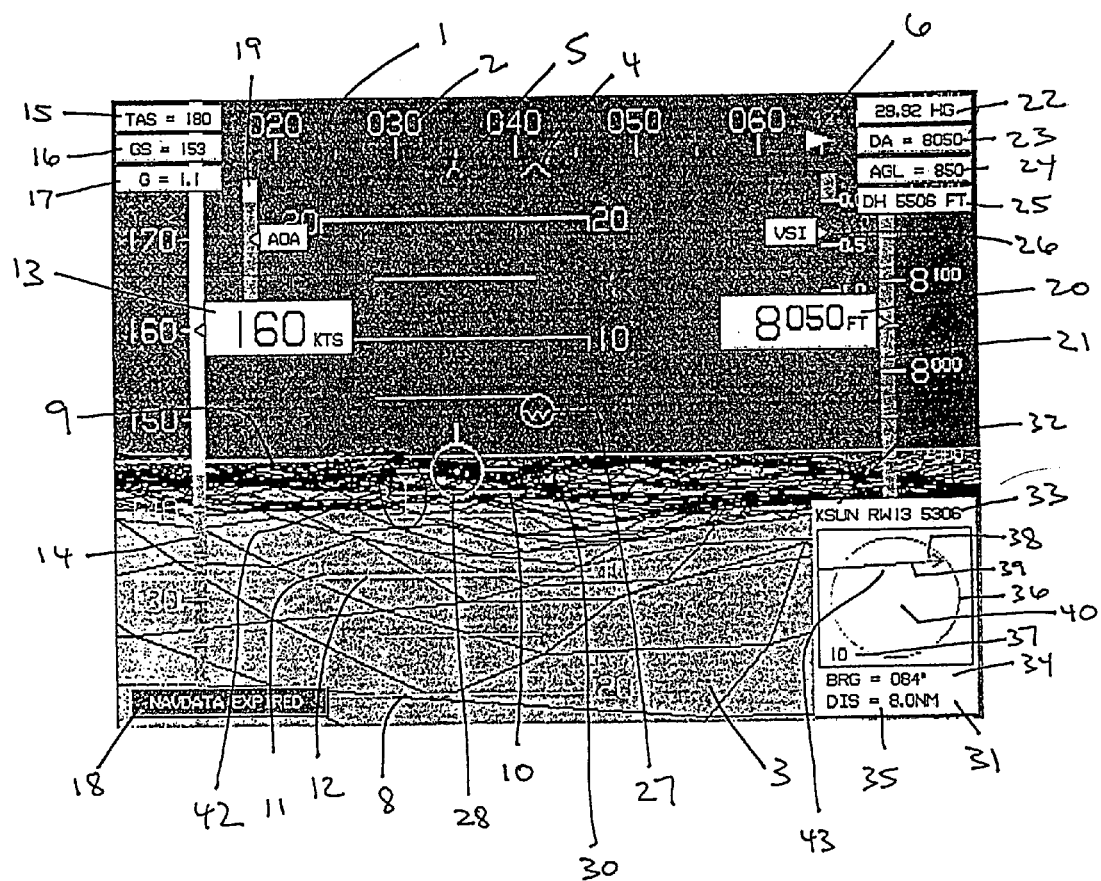
FIG. 1 shows the primary flight display according to the present invention.
Figure 2:
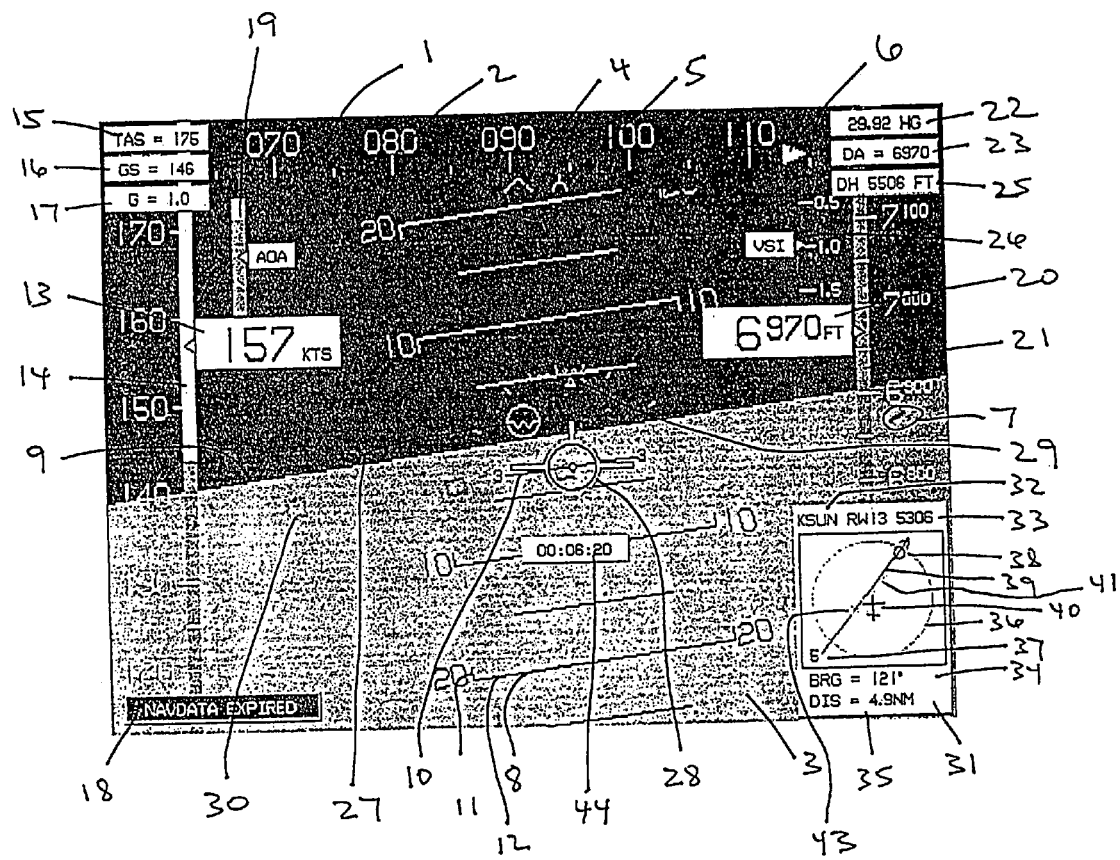
FIG. 2 shows the primary flight display according to the present invention with the terrain display turned off.

Referring now to FIGS. 1 and 2, the primary flight display of the present invention is disclosed. The primary flight display includes a heading scale 1 across the top. The heading scale is preferably aligned with magnetic North although it can also be aligned with true North. The digits 2 of the heading scale are spaced so that, at an aircraft roll angle of zero, the digits conform to the three-dimensional primary flight display background 3. The background 3 is generated from terrain elevation and obstruction elevation data stored in electronic memory. In the preferred embodiment, provision is made for the pilot to be able to selectively enable and disable terrain and obstruction rendering. In some cases, it is preferable to deselect terrain and obstruction rendering to enhance readability of navigation symbology. The heading scale 1 includes a heading carat 4 aligned with the longitudinal axis of the aircraft, and a track pointer 5 aligned with the aircraft's track across the earth. A waypoint marker is also displayed on the heading scale at a point that corresponds with the selected waypoint 7. When the selected waypoint 7 is not visible on the background 3, the waypoint marker is replaced by an arrow 6 at either the right-most or left-most limit of the heading scale 1 to indicate the shortest direction of turn to the selected waypoint 7.

The primary flight display further includes a pitch scale 8 and horizon line 9 that rotate in conjunction with the background 3 according to the aircraft's roll angle. The increments on the pitch scale 8 are spaced to conform to the background 3. In the preferred embodiment, the pitch scale has 5 degree increments with a special reference line 10 located at −3 degrees to correspond to a normal aircraft landing approach angle. Pointer bars 11 at the ends of each numbered pitch scale bar 12 indicate the direction to the horizon.

The primary flight display further includes an airspeed box 13 and airspeed scale 14. The airspeed scale includes colored regions to indicate the relationship of the indicated airspeed to stalling speeds, flap extension speeds, structural cruising speeds, never exceed speeds and other speeds of interest to the pilot. The airspeed box 13 and airspeed scale 14 can indicate groundspeed, true airspeed, or indicated/calibrated airspeed. In the preferred embodiment, the airspeed box 13 and airspeed scale 14 indicated/calibrated airspeed. Values such as true airspeed 15, groundspeed 16, normal acceleration or G-force 17, mach number, outside air temperature, and other parameters of interest can be displayed in corner boxes. The primary flight display also includes a region for warning messages 18.

The primary flight display further includes an angle of attack ("AOA") indicator 19. Unlike prior art AOA indicators, the AOA indicator of the present invention presents its information graphically using a colored bar rather than numerically. The AOA indicator of the present invention also monitors aircraft configuration and climb rate to determine the colored bar colors and locations. When in a landing configuration (i.e. landing gear or flaps deployed), the AOA indicator uses two colors, red and green. The boundary between the two colors represents the AOA for 1.3Vs for that particular configuration. In configurations other than landing, the AOA indicator is keyed to display either climb parameters or cruise parameters depending upon the sensed power and rate of climb. Thus, the AOA indicator of the present invention uses the color green to indicate normal operating AOA's; the color white to indicate operation between max range (cruise parameters) or best rate of climb (climb parameters) AOA and max endurance (cruise parameters) or best angle of climb (climb parameters) AOA; the color yellow to indicate operation between max endurance (cruise parameters) or best angle of climb (climb parameters) AOA and stall (AOA); and the color red to indicate operation above stall AOA. Thus, flight with the AOA indicator at the green-white juncture indicates either max range AOA or best rate of climb AOA while flight at the white-yellow juncture indicates flight at max endurance AOA or best angle of climb AOA. The yellow-red juncture represents stall onset AOA.

The primary flight display further includes an altitude box 20 with altitude scale 21. Altitude warnings can be set by the pilot and will cause a colored bar to be superimposed upon the altitude scale. The preferred embodiment includes two altitude warning modes, altitude hold and decision height Altitude hold mode causes a green bar centered upon the selected altitude to be superimposed upon the altitude scale 21 from 100 feet below the selected altitude to 100 feet above the selected altitude, further causes yellow bars to be superimposed upon the altitude scale 21 from 100 feet below to 300 feet below and 100 feet above to 300 feet above the selected altitude, and further causes red bars to be superimposed upon the altitude scale 21 at all other altitudes. Decision height mode causes a red bar to be superimposed upon the altitude scale 21 at all altitudes below the selected altitude, a yellow bar to be superimposed upon the altitude scale 21 from the selected altitude to 200 feet above the selected altitude, and a green bar to be superimposed upon the altitude scale 21 at all altitudes above 200 feet above the selected altitude. The altitude box 20 and altitude scale 21 can display altitude above mean sea level, altitude above ground level, density altitude or pressure altitude. In the preferred embodiment, the altitude box 20 and altitude scale 21 display altitude above mean sea level as adjusted by an altimeter setting 22. Altitude related values such as altimeter setting 22, density altitude 23, altitude above ground level 24, altitude alert mode and selected altitude 25, and other parameters of interest can be displayed in corner boxes. The primary flight display further includes a vertical speed indicator scale with pointer 26. In the preferred embodiment, the background of the vertical speed indicator scale is color coded to indicate climb (green) or descent (red).

Fixed in the center of the primary flight display so as to align with the longitudinal axis of the aircraft is a waterline symbol 27. In the preferred embodiment, rotation of the background 3 and pitch scale 8 occurs relative to the waterline symbol 27. A flight path marker 28 appears on the background 3 so as to coincide with the aircraft's actual flight path as projected upon the outside world. Thus, the flight path marker 28 is displaced laterally parallel to the horizon with respect to the center of the display to account for the difference between aircraft track and heading, and is displaced vertically orthogonally to the horizon to account for aircraft glidepath or climb angle. Because the flight path marker 28 is used in conjunction with a three-dimensional background 3, the flight path marker utility normally associated with a HUD is achieved. A bank angle scale 29 is centered upon the flight path marker 28 to display aircraft bank angle. In the preferred embodiment, the bank angle scale 29 disappears at small angles of bank to automatically declutter the display. At very high crab angles (the difference between heading and track) the flight path marker becomes "caged" to the center of the display and a "ghost" is displayed where the flightpath marker would normally be displaced laterally. A timer 44 is optionally displayed and can display local time, Zulu time, a count-down timer or a count-up timer.

The primary flight display further includes a full complement of three-dimensional navigation symbology such as highway-in-the-sky boxes 30, three-dimensional runway depictions 7, "tethered balloon" waypoint symbols 42, and "free balloon" waypoint symbols for navigational fixes without elevation data.

A miniature moving map display 31 is displayed in one corner of the primary flight display to give a vertical perspective of the relationship of the aircraft to the selected waypoint. The miniature moving map display 31 displays the identifier 32 and elevation 33 of the selected waypoint along with bearing 34 and distance 35 to that waypoint. The map portion of the moving map display 31 includes a range circle 36 with range indicator 37, a waypoint symbol 38 with course line 39. When the selected waypoint is a runway and approach symbology is enabled, the initial point is represented on the miniature moving map by an x symbol 43. The miniature aircraft 40 represents the location of the aircraft and includes a projected path line 41 emanating from the center of the miniature aircraft 40. In the preferred embodiment, the projected path displays projected aircraft path up to one minute in the future based upon current flight dynamics.

2. The Moving Map

Figure 3:
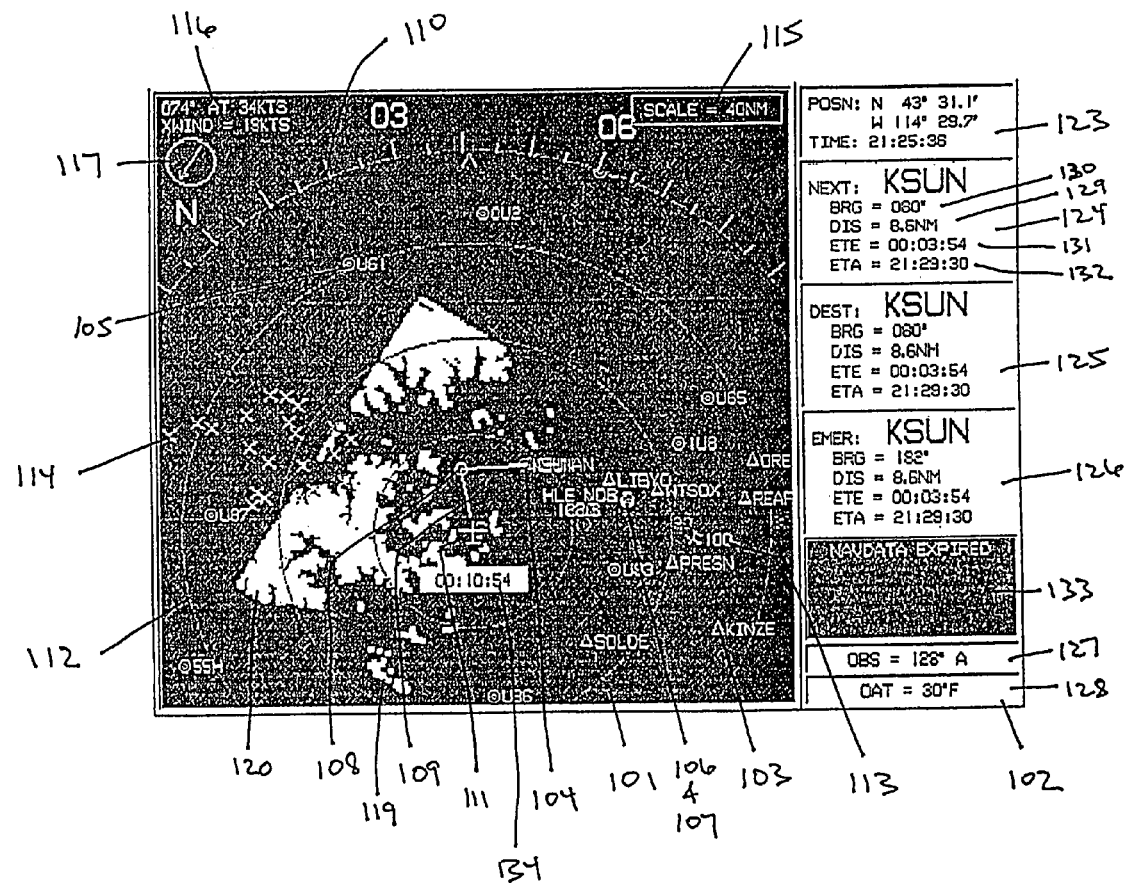
FIG. 3 shows the moving map display according to the present invention.
Figure 4:
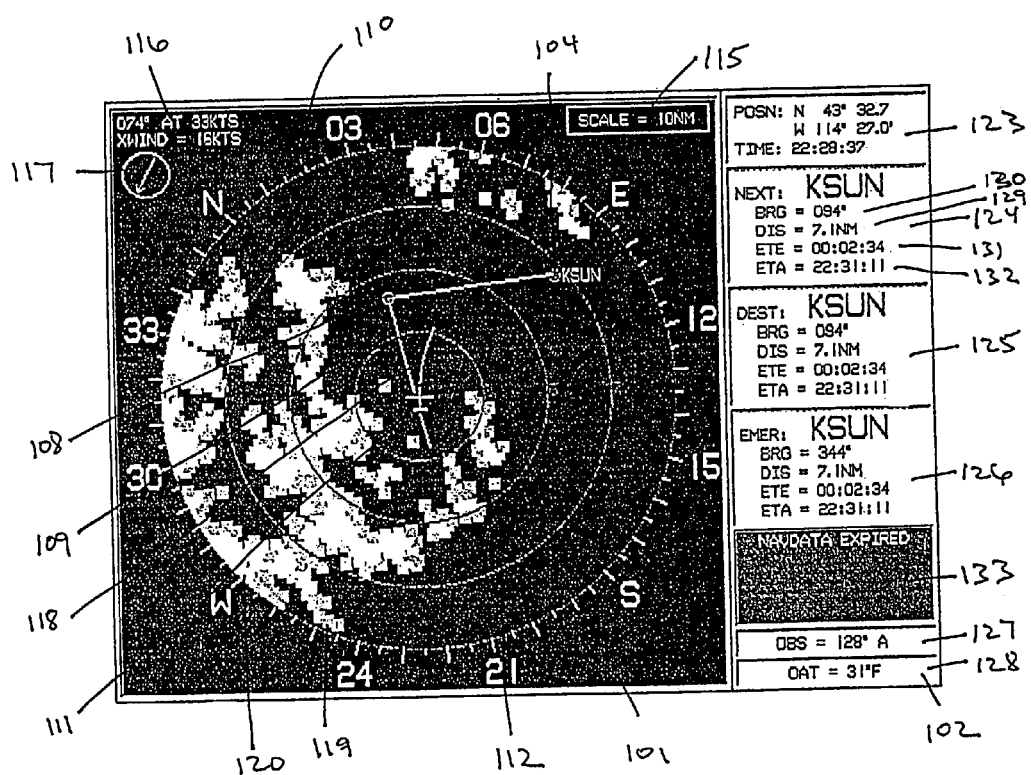
FIG. 4 shows the moving map display according to the present invention.
Figure 5:
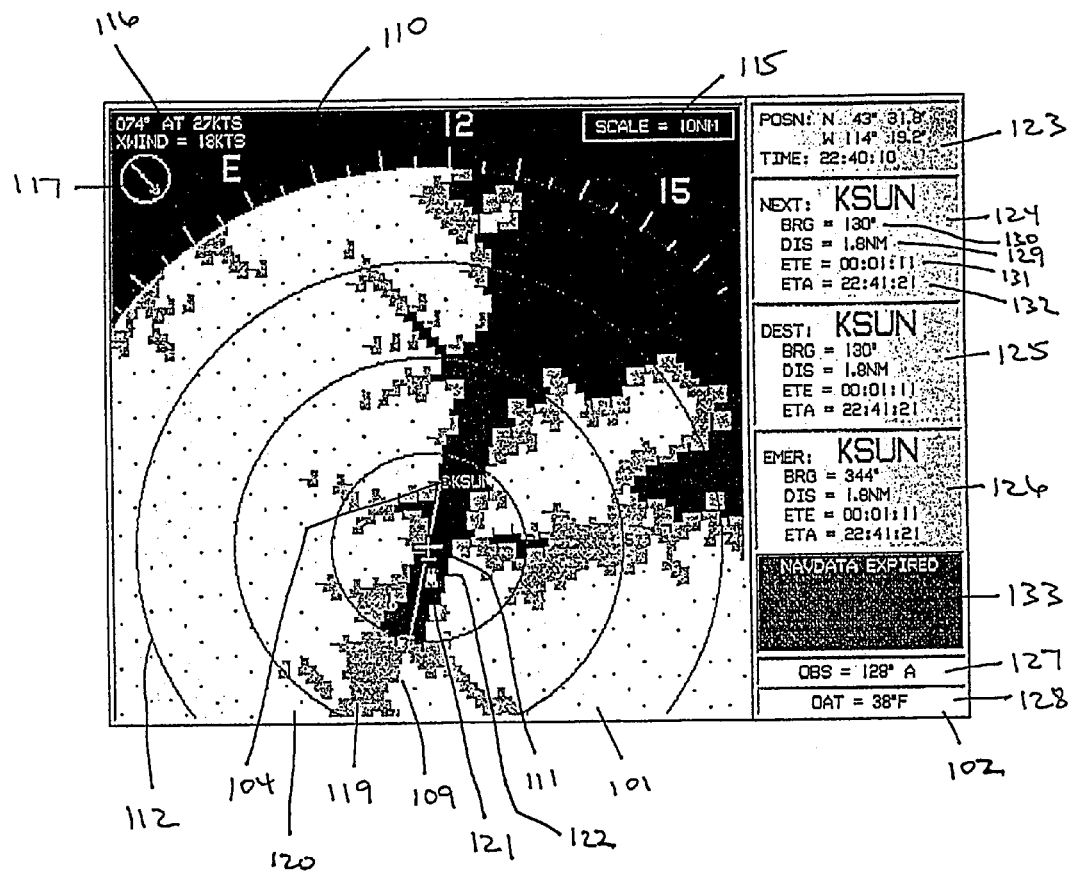
FIG. 5 shows the moving map display according to the present invention.

Referring now to FIGS. 3, 4 and 5, the moving map of the present invention is disclosed. The moving map of the present invention is similar to other current state of the art moving maps from the standpoint of displaying navigational points from a vertical perspective. However, the moving map of the present invention also imports flight parameters such as altitude, attitude, and true airspeed to generate novel displays that enhance situational awareness.

In the preferred embodiment, the moving map of the present invention is divided into a map section 101 and a data section 102. The map section displays standard aerial navigation data such as fixes 103, IFR airports 104, VFR airports 105, NDB's 106, VOR's 107, initial points 108, and flight routes 109. The moving map is displayed within a compass rose 110 and can be displayed with the aircraft location 111 offset or centered. Range rings 112 emanate from the aircraft location to display range to displayed symbols. Datalink symbology 113 and weather symbology 114 can be imported into the moving map. The scale of the moving map is pilot selectable and a scale box 115 presents the currently select map scale. Wind information 116 is also presented and includes a graphical wind vector 117. Like the miniature moving map on the primary flight display, a projected path 118 based upon aircraft attitude emanates from the aircraft location 111.

In addition to the above features, the preferred embodiment of the present invention also imports aircraft altitude and, making use of the terrain and obstruction databases, displays terrain and obstructions based upon threat level. In the preferred embodiment, terrain that is within 250 below the aircraft's altitude to the aircraft's altitude is displayed-in a dark gray color 119. Terrain at or above the aircraft's altitude is displayed in a light gray color 120. As can be seen from FIGS. 3–5, terrain presented in this manner makes the location of mountains, valleys, flood plains and tributaries readily apparent to the pilot. Likewise, obstructions that are within 250 below the aircraft's altitude to the aircraft's altitude are displayed in a yellow color 121 whereas obstructions at or above the aircraft's altitude are displayed in red 122. As with the terrain presentation, selective presentation with colors signifying threat level results in a naturally decluttered display that focuses the pilot's attention on true hazards to navigation.

The data section 102 of the moving map displays various parameters of interest in navigating the aircraft. Current position and time 123, next waypoint information 124, destination waypoint information 125, emergency; airport information 126, OBS (omni bearing selector) setting and A (automatic) or M (manual) 127, as well as outside air temperature 128 are all displayed. Parameters displayed for next waypoint 124, destination waypoint 125 and emergency airport 126 in the preferred embodiment include distance 129, bearing 130, estimated time enroute (ETE) 131, and estimated time of arrival (ETA) 132. The data section 102 also includes a critical message section 133. The emergency airport 126 displayed is the nearest airport that meets preset parameters of runway length and IFR/VFR capability.

Normally, OBS 127 is set automatically by selection of a route or waypoint. If a route is selected, OBS is set to the course between waypoints of the route and automatically updates as the aircraft flies over the waypoints. If a normal waypoint (i.e. a fix, NDB, VOR, or airport) is selected without selecting a route, then the OBS is automatically set to the course from aircraft present position to the waypoint. If a runway is selected, then the OBS is automatically set to the runway heading. Whenever a normal waypoint is selected, the pilot can also override the automatic setting and manually set any OBS course desired. When-this happens, an M (manual) is displayed in the OBS setting box 127. In the preferred embodiment, the automatic OBS setting cannot be manually overridden when a runway is selected.

A timer 134 is optionally displayed and can display local time, Zulu time, a count-down timer or a count-up timer.

3. The Engine Parameter Display

Figure 6:
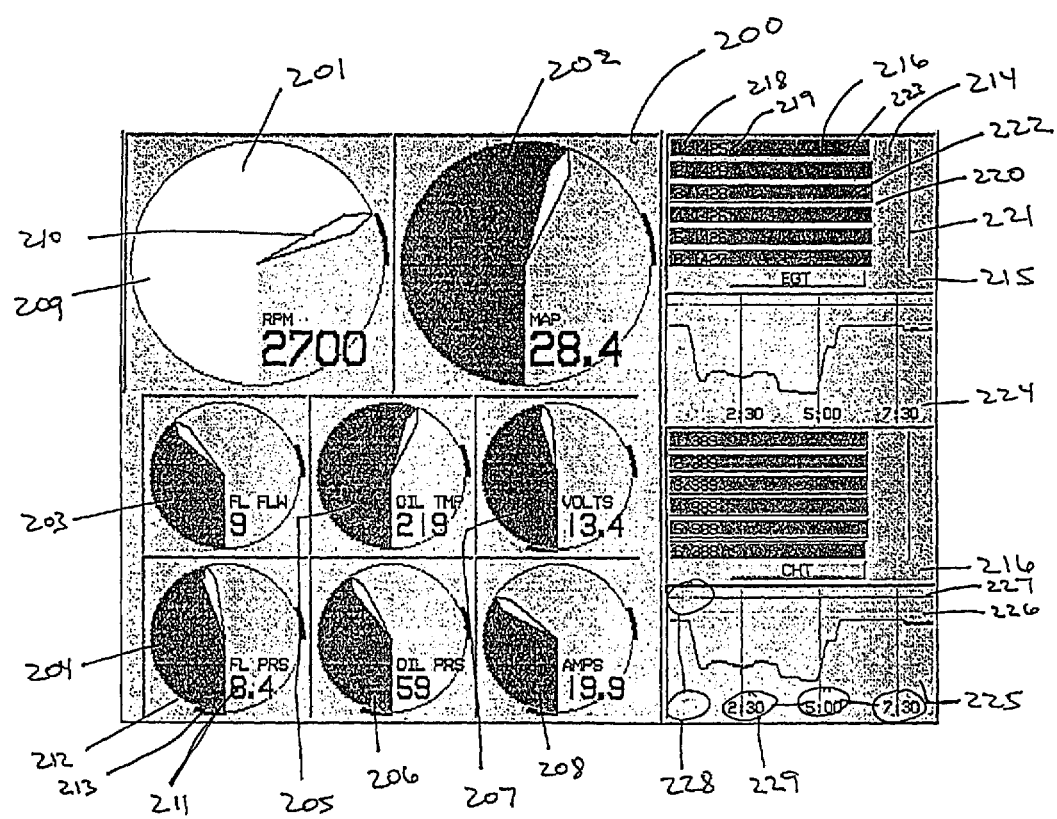
FIG. 6 shows the engine parameter display according to the present invention.

Referring now to FIG. 6, the engine display of the present invention is disclosed. The engine display 200 consists of various round gauges arranged on a background. In the preferred embodiment for monitoring a single-engine piston powered light plane, engine speed 201, manifold pressure 202, fuel flow 203, fuel pressure 204, oil temperature 205, oil pressure 206, volts 207, and amps 208 are displayed in the circular gauge format. Other parameters can be displayed, and additional engine displays can be generated to ensure that more complex, multi-engined, or gas-turbine powered aircraft are adequately instrumented. In addition, it would also be possible to present a display showing status of other aircraft systems, such as landing gear systems, flap systems, and hydraulic systems.

Each gauge-type display includes a pie wedge 209 and leading pointer 210. The pie wedge is color keyed to correspond to the parameter displayed. For example, if the displayed parameter is in its normal operating range, the pie wedge 209 is preferably filled with green. Likewise, if the displayed parameter is in a cautionary or alarm range, the pie wedge 209 is preferably filled with yellow or red respectively. By changing the color of the entire pie wedge, the pilot's attention is clearly focused on whatever condition is out of its normal parameters. The gauge-type displays further include digital labels and readouts 211 and peripheral yellow 212 and red 213 arcs denoting cautionary and alarm parameter ranges.

An alternative method for displaying engine parameters, and one that is preferred for comparatively showing multiple parameters of the same type, is the bar chart display 214. As shown in FIG. 6, a single-engine aircraft with a six-cylinder piston engine is displayed. Each cylinder of the engine is fitted with a thermocouple for sensing cylinder head temperature (CHT) and a thermocouple for sensing exhaust gas temperature (EGT). These values are then displayed in a comparative bar-graph form, with EGT values shown in the upper box 215 and CHT values shown in the lower box 216. Each bar 217 is labeled with the cylinder number 218 and the parameter reading 219. Each box further includes a yellow 220 and red 221 line indicating cautionary and alarm ranges for the parameter. As with the pie charts, each bar 217 is colored to represent whether the parameter is in the normal range (green), a cautionary range (yellow) or an alarm range (red). This coloring scheme quickly draws the pilots attention to an errant condition and further identifies the exact cylinder having problems. In addition, the bar representing the highest reading is given a three-dimensional "unpushed button" effect 222 while the bar representing the lowest reading is given a three-dimensional "pushed button" effect 223.

Below each bar-graph box 215 and 216 is a recording chart box 224 and 225 showing the history of the parameters over time. As shown in FIG. 6, the boxes in the preferred embodiment show the history of the parameters 10 minutes into the past, although the amount of history displayed can be selected by the pilot or set to a value other than 10 minutes. Each recording chart box 224 and 225 includes a yellow 226 and red 227 line indicating cautionary and alarm ranges for the parameter. Scale numbers 228 indicate the range displayed, while time numbers 229 indicate the time in history represented by a given horizontal location on the recording chart box 224 and 225. Each parameter plotted in a recording chart box 224 and 225 is given its own unique color. Under normal conditions, values for each parameter will remain relatively close as shown in FIG. 6. That is why the recording chart boxes 224 and 225 in FIG. 6 seem to only plot a single value. However, if any individual parameter departs from the others, that departure will be clearly shown in the recording chart boxes 224 and 225 by virtue of all parameters being recorded and drawn. Recording chart boxes 224 and 225 are invaluable aids to the pilot in spotting adverse engine trends. All engine parameters and air data/navigation parameters are also stored in electronic memory for later retrieval and analysis.

4. Derivation of Useful Parameters from Inexpensive Sensors (a) Derivation of Angle of Attack Angle of Attack (AOA) is a very useful parameter due to the fact that for a given configuration, an aircraft's performance is determined primarily by angle of attack. In other words, regardless of weight or altitude, an aircraft will achieve its best rate of climb at a certain AOA, its best angle of climb at another certain AOA, maximum endurance at yet another certain AOA, and so forth. Thus, flying an aircraft by reference to AOA offers a far more precise manner of controlling aircraft performance than by reference to airspeed or other parameters.

In most cases, AOA is directly sensed by monitoring sensing vanes attached to the aircraft that align with the relative wind. Other devices sense AOA indirectly by monitoring relative static air pressure differences between surface points at various locations on a structure or body exposed to the airstream. These methods are disadvantageous in that they require a separate, maintenance intensive system to be installed on the aircraft. Often times, the separate system is also costly.

While the displays of the present invention can easily make use of AOA determined by conventional methods, it is also an object of the present invention to reduce the complexity and cost of sensing systems as much as possible. Accordingly, the preferred embodiment of the present invention uses AOA derived from sensing acceleration in a direction aligned with the vertical axis of the aircraft using an inexpensive accelerometer, the aircraft's indicated, calibrated or equivalent airspeed (IAS, CAS or EAS) from an air data computer system, and the weight of the aircraft derived from a known start weight less the weight of fuel consumed during flight (either totalized from a fuel flow sensor or directly sensed with a fuel quantity sensor) and the weight of items dropped from the aircraft. In this way, AOA is derived from the formula:

$$AOA = K \times W \times G / IAS^2$$

where K is an empirically derived constant unique to any given aircraft, W is aircraft weight, G is vertical axis acceleration, and IAS is indicated, calibrated or equivalent airspeed. Once AOA is determined, it is displayed as previously described in the primary flight display section.

A further use of AOA calculated in this manner is to indirectly compute aircraft pitch angle. Aircraft flight path angle relative to the air mass (not the earth) is given by:

$$\text{flight path angle}_{air\ mass} = ARCSIN(\text{vertical speed} \div \text{true air speed})$$

Vertical speed in this instance is preferably instantaneous vertical speed which can be determined by integrating accelerations perpendicular to the surface of the earth and filtering with vertical speed derived over time by the air data computer. Once air mass flight path angle is determined, an AOA increment is added to derive aircraft pitch angle as follows:

$$\text{aircraft pitch angle} = \text{flight path angle}_{air\ mass} + AOA \times COS(\text{bank})$$

b. Using Wind Corrected True Airspeed and Heading for Groundspeed and Track

Global positioning system (GPS) receivers have become an ubiquitous method for readily determining groundspeed and track. This is because these receivers directly determine a vehicles position on the surface of the earth and, with one or more surface determinations made, can derive groundspeed and track across the earth's surface. Unfortunately, GPS solutions come relatively slowly (once per second in most receivers) and thus GPS sensed information is of relatively low reliability when trying to determine instantaneous track and groundspeed information, especially in a turning aircraft. Since the groundspeed and track of an aircraft is greatly affected by wind, turning flight presents a particular challenge for GPS derivation of instantaneous groundspeed and track because of wind effects coupled with the slow update rate of most GPS receivers.

Figure 7:
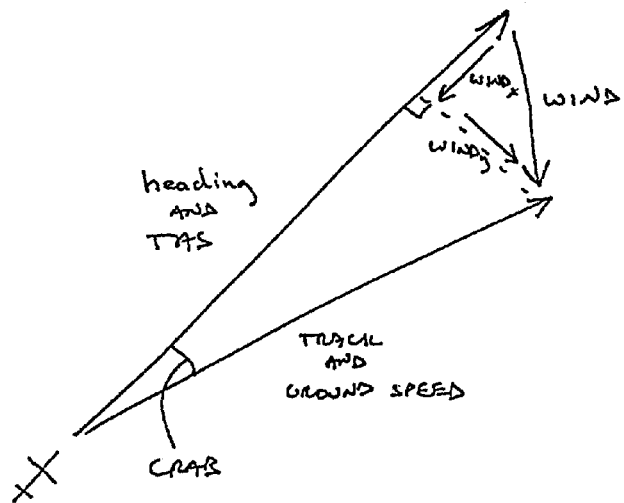
FIG. 7 shows the methodology for deriving wind according to the present invention.

The method of the preferred embodiment consists of determining wind by comparing GPS groundspeed and track determined during non-turning flight to the horizontal component of true airspeed and heading. To practice this method, an algorithm first determines when an aircraft is flying in a sufficiently straight line that GPS can be reliably used for comparison purposes. If attitude information is available, this determination can be made by referring to aircraft bank angle. A system can also look for periods of relatively constant heading or track to determine when the aircraft is not turning. In non-turning flight, wind is derived as follows (see FIG. 7):

1. Derive crab angle from aircraft track and heading:

$$crab = track - heading$$

2. Derive the component of wind parallel to aircraft heading:

$$wind_x = groundspeed \times COS(crab) - true\ airspeed \times COS(pitch)$$

which in most circumstances (i.e. low pitch values) can be simplified to:

$$wind_x = groundspeed \times COS(crab) - true\ airspeed$$

3. Derive the component of wind perpendicular to aircraft heading:

$$wind_y = groundspeed \times SIN(crab)$$

4. Compute wind speed using Pythagorean theorem:

$$wind\ speed = SQR(wind_x^2 + wind_y^2)$$

5. Compute wind direction:

$$wind\ direction = heading + ARCTAN(wind_y \div wind_x)$$

Once wind is determined, track and groundspeed used by the system for display is re-computed by applying the derived wind to heading and the horizontal component of true airspeed. Wind is continuously determined during periods of non-turning flight. If turning flight is detected, the system remembers the last determined wind and applies that wind to current heading and true airspeed to derive instantaneous track and groundspeed, thus correcting for the inherent deficiencies of GPS track and groundspeed in turning flight.

Groundspeed, track and wind derived in this manner has many uses. One such use is determining the correct position of a flight path marker. As discussed in the primary flight display section, aircraft track determines the location of the flight path marker parallel to the displayed horizon of the primary flight display. In addition, groundspeed is a major element in determining the earth-referenced aircraft flight path angle as follows:

$$\text{flight path angle}_{earth} = ARCTAN(\text{vertical speed} \div \text{groundspeed})$$

Flight path angle determines the location of the flight path marker perpendicular to the displayed horizon of the primary flight display. By deriving groundspeed and track from wind, heading, and true airspeed, a smooth flight path marker can be displayed during turning flight without the requirement of an expensive inertial navigation unit as is commonly used. Vertical speed in this instance is preferably instantaneous vertical speed which can be determined by integrating accelerations perpendicular to the surface of the earth and filtering with vertical speed derived over time by the air data computer.

Another use for wind determined in this manner is in the derivation of aircraft bank angle in the event that an AHRS (attitude heading reference system), INS (inertial navigation system), or other attitude determining system is failed or not installed. This method makes use of the level flight relationship between true airspeed, rate of turn and bank angle given as:

$$\text{bank angle} = \text{ARCTAN}(k \times ROT \times V)$$

where k is a units constant, ROT is aircraft heading turn rate, and V is the horizontal component of true airspeed (true airspeed×COS(pitch) often simplified to just true airspeed). In this method, true airspeed from the air data computer is used in conjunction with turn rate to find bank angle. Turn rate can be sensed directly with a rate gyro or can be derived from changes in heading. Unfortunately, simple heading sensors give erroneous readings when they are not parallel to the earth's surface. In addition, using changes in track to derive a rate of turn (as disclosed in U.S. Pat. Nos. 5,841,370 and 5,451,963) is prone to errors due to the effects of wind. However, by applying calculated wind to successive track readings thus converting them into heading readings, rate of turn can be derived from changes in computed heading. By converting track to heading using calculated wind, wind errors are minimized and a relatively accurate bank angle can be calculated using the above disclosed formula.

It will therefore be readily understood by those persons skilled in the art that the present invention is susceptible of broad utility and application. Many embodiments and adaptations of the present invention other than those described, as well as many variations, modifications and equivalent arrangements will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A flight display for an electronic flight instrument system comprising:
    a sensor for detecting bank angle, and
    a display of aircraft attitude including a bank angle scale, said bank angle scale automatically disappearing upon detection by the sensor of a bank angle less than a selected bank angle and appearing upon detection by the sensor of a bank angle in excess of the selected bank angle.

* * * * *